ically-based seed detection in a 3-D seismic data volume. The method incorporates criteria that honor the layered nature of the subsurface so that the resulting seismic objects are stratigraphically reasonable. The method may be used to extract from a seismic data volume all seismic objects that satisfy the input criteria. Alternatively, the method may be used to determine the size and shape of a specific seismic object in a seismic data volume.

United States Patent
Dunn et al.

(10) Patent No.: US 7,024,021 B2
(45) Date of Patent: Apr. 4, 2006

(54) METHOD FOR PERFORMING STRATIGRAPHICALLY-BASED SEED DETECTION IN A 3-D SEISMIC DATA VOLUME

(75) Inventors: Paul A. Dunn, Houston, TX (US); Marek K. Czernuszenko, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/654,138

(22) Filed: Sep. 3, 2003

(65) Prior Publication Data

US 2004/0062145 A1    Apr. 1, 2004

Related U.S. Application Data

(60) Provisional application No. 60/413,814, filed on Sep. 26, 2002.

(51) Int. Cl.
*G06K 9/00* (2006.01)

(52) U.S. Cl. .................... 382/109; 367/14; 367/68; 367/72; 367/73; 367/74; 702/16

(58) Field of Classification Search ............... 382/109, 382/154, 199, 206, 224, 205, 100; 367/7, 367/8, 9, 14, 37, 38, 47, 59, 68, 72–74; 702/13, 702/14, 16, 18, 48, 156, 159
See application file for complete search history.

(56) References Cited

U.S. PATENT DOCUMENTS

| 4,633,401 | A | * | 12/1986 | Flinchbaugh | ............... 367/72 |
| 4,751,643 | A | | 6/1988 | Lorensen et al. | |
| 5,056,066 | A | * | 10/1991 | Howard | ............... 367/72 |
| 5,128,899 | A | * | 7/1992 | Boyd et al. | ............... 367/50 |
| 5,153,858 | A | | 10/1992 | Hildebrand | ............... 367/72 |
| 5,475,589 | A | | 12/1995 | Armitage | ............... 364/421 |
| 5,501,273 | A | * | 3/1996 | Puri | ............... 166/252.5 |
| 5,563,949 | A | | 10/1996 | Bahorich et al. | ............... 364/421 |
| 5,586,082 | A | | 12/1996 | Anderson et al. | |
| 5,671,136 | A | * | 9/1997 | Willhoit, Jr. | ............... 702/18 |
| 5,835,882 | A | * | 11/1998 | Vienot et al. | ............... 702/7 |
| 5,838,634 | A | | 11/1998 | Jones et al. | ............... 367/73 |
| 5,884,229 | A | | 3/1999 | Matteucci | ............... 702/14 |
| 5,966,672 | A | * | 10/1999 | Knupp | ............... 702/16 |
| 6,018,498 | A | * | 1/2000 | Neff et al. | ............... 367/72 |
| 6,516,274 | B1 | | 2/2003 | Cheng et al. | ............... 702/14 |
| 6,674,689 | B1 | * | 1/2004 | Dunn et al. | ............... 367/43 |
| 2002/0172401 | A1 | * | 11/2002 | Lees et al. | ............... 382/109 |
| 2004/0153247 | A1 | * | 8/2004 | Czernuszenko et al. | ...... 702/14 |

OTHER PUBLICATIONS

U.S. Appl. No. 10/195,582, filed Jul. 15, 2002, Czernuszenko et al.

* cited by examiner

*Primary Examiner*—Sanjiv Shah
*Assistant Examiner*—Craig Kronenthal
(74) *Attorney, Agent, or Firm*—ExxonMobil Upstream Research Co. Law Department

(57) ABSTRACT

The invention is a method for performing a stratigraphically-based seed detection in a 3-D seismic data volume. The method incorporates criteria that honor the layered nature of the subsurface so that the resulting seismic objects are stratigraphically reasonable. The method may be used to extract from a seismic data volume all seismic objects that satisfy the input criteria. Alternatively, the method may be used to determine the size and shape of a specific seismic object in a seismic data volume.

32 Claims, 13 Drawing Sheets

FIG. 1B    FIG. 1C

METHOD FOR PERFORMING STRATIGRAPHICALLY-BASED SEED DETECTION IN A 3-D SEISMIC DATA VOLUME

This application claims priority from U.S. Patent Application No. 60/413,814 filed Sep. 26, 2002.

FIELD OF THE INVENTION

This invention relates generally to the field of seismic prospecting and, more particularly, to seismic data interpretation. Specifically, the invention is a method for performing a seed detection in a 3-D seismic data volume to detect seismic objects that satisfy certain attribute criteria and are stratigraphically reasonable.

BACKGROUND OF THE INVENTION

In the oil and gas industry, seismic prospecting techniques commonly are used to aid in the search for and evaluation of subterranean hydrocarbon deposits. A seismic prospecting operation typically consists of three separate stages: data acquisition, data processing, and data interpretation, and success of the operation depends on satisfactory completion of all three stages.

In the data acquisition stage, a seismic source is used to generate an acoustic impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes.

During the data processing stage, the raw seismic data recorded in the data acquisition stage are refined and enhanced using a variety of procedures that depend on the nature of the geologic structure being investigated and on the characteristics of the raw data themselves. In general, the purpose of the data processing stage is to produce an image of the subsurface from the recorded seismic data for-use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

Currently, 3-D seismic data is the preferred tool for most seismic prospecting operations. As used herein, a "3-D seismic data volume" is a 3-D volume of discrete x-y-z or x-y-t data points, where x and y are mutually orthogonal, horizontal directions, z is the vertical direction, and t is two-way vertical seismic signal traveltime. In subsurface models, these discrete data points are often represented by a set of contiguous hexahedrons known as "cells" or "voxels," with each cell or voxel representing the volume surrounding a single data point. Each data point, cell, or voxel in a 3-D seismic data volume typically has an assigned value ("data sample") of a specific seismic data attribute such as seismic amplitude, acoustic impedance, or any other seismic data attribute that can be defined on a point-by-point basis.

Seismic data are typically represented by a seismic data trace. As used herein, a "seismic data trace" is the vertical record of a selected seismic attribute (e.g., seismic amplitude or acoustic impedance) at a single x-y (map) location. A seismic trace can be represented as a stack of cells or voxels, or by a continuous curve (known as a "wiggle trace") whose amplitudes reflect the attribute values at each z (or t) data point for the x-y location in question.

A common problem in 3-D seismic data interpretation is the extraction of geologic features from a 3-D seismic data volume and evaluation of their geometric relationships to each other and implications for connectivity. A "seismic object" is defined as a region of a 3-D seismic data volume in which the value of a certain selected seismic attribute (acoustic impedance, for example) satisfies some arbitrary threshold requirement. For example, the number may be greater than some minimum value and/or less than some maximum value. Bulk processing of a seismic data volume at a certain attribute threshold results in the detection of one or more seismic objects (also known as "geobodies" or simply "bodies"). The desired result, is that these seismic objects should correspond to actual underground reservoirs. Seismic data interpretation time could be reduced significantly if one could bulk process a seismic data volume, and generate a collection of seismic objects, which represent the layered stratigraphy of the subsurface.

Identification of seismic objects (geobodies) using various seismic attributes as indicators is known in the seismic art. All known methods are deficient in that they cannot identify geobodies with moderate or low attribute values. Further, these known methods commonly produce geobodies that are not stratigraphically reasonable. Existing automated techniques produce geobodies that crosscut stratigraphic and structural boundaries and have unrealistic shapes in which a geobody may overlie itself in a spiraling pattern.

One technique for identifying and extracting seismic objects from a 3-D seismic data volume is known as "seed picking" (also known as "region growing"). Seed picking results in a set of voxels in a 3-D seismic data volume which fulfill user-specified attribute criteria and are connected. Seed picking has been implemented in several commercial software products such as VoxelGeo®, VoxelView®, GeoViz®, Gocad®, and others. Seed picking is an interactive method, where the user specifies the initial "seed" voxel and attribute criteria. The seed picking algorithm marks an initial voxel as belonging to the current object, and tries to find neighbors of the initial voxel that satisfy the specified attribute criteria. The new voxels are added to the current object, and the procedure continues until it is not possible to find any new neighbors fulfilling the specified criteria.

Seed picking requires a criterion for connectivity. There are two criteria commonly used, although others may be defined and used. One definition is that two cells or voxels are connected (i.e., are neighbors) if they share a common face. By this definition of connectivity, a cell (or voxel) can have up to six neighbors. The other common criterion for being a neighbor is sharing either an edge, a face, or a corner. By this criterion, a cell (or voxel) can have up to twenty-six neighbors.

Seed picking may have originated in medical applications. For example, U.S. Pat. No. 4,751,643 to Lorensen, et al. discloses a specific seed picking algorithm that enables radiologists and surgeons to display only bone tissue or only soft tissue and provides them with extensive preoperative information. The algorithm is claimed to be very fast because it accesses the original data values only once. The first step is labeling, which means checking the attribute criteria for each cell. It marks cells fulfilling the criteria as 1, and the others as 0. Then the connectivity (region growing) algorithm is employed which works on this single-bit data set.

In the oil and gas industry, seismic object identification by seed picking has become widespread. For example, U.S. Pat. No. 5,586,082 to Anderson, et al. discloses a seed growing method of detecting seismic objects with an interest in how these objects, distinct at one threshold of the chosen attribute, may be connected at another threshold. The Anderson, et al. method identifies high amplitude regions, suggestive of petroleum presence, using seismic attribute analysis, with the object of determining oil or gas migration pathways connecting those regions, or alternatively to determine that certain regions are unconnected. The method depends on having and analyzing multiple 3-D seismic surveys of the same region acquired at different times. Small changes in these surveys are used to suggest the drainage pathways and connectivity.

Co-pending U.S. patent application Ser. No. 10/195582 discloses a method for predicting connectivity of seismic objects determined from seismic data collected from a subterranean region. Generally, the method comprises the steps of (a) dividing the subterranean region into cells and determining from the seismic data the value of a preselected seismic attribute in each cell; (b) choosing a threshold criterion for the value of the seismic attribute; (c) determining for each cell whether the value of the selected attribute for that cell satisfies the chosen criterion; (d) identifying seismic objects containing only connected cells that satisfy the attribute criterion, using a pre-selected definition of connectivity; (e) repeating steps (b) through (d) for at least one different value of the attribute threshold; and (f) tracking each seismic object identified for changes in its size, spatial position, and connection to other objects, all as a function of attribute threshold value.

Existing seed detection methods are entirely cell connectivity-based. That is, they have no criteria for connectivity other than cell-to-cell contact. This purely cell-based approach has significant drawbacks in that it treats each voxel or cell as an independent measurement of the subsurface when in fact the primary elements in seismic data are reflections composed of many vertically stacked layers of cells which form oscillations about a zero mean. Data sets that are derivatives of reflection seismic surveys may not have attributes that vary about a zero mean, but they all have internal structure that follows the layered nature of the subsurface stratigraphy. In seismic amplitude data, reflections represent acoustic discontinuities in the subsurface and are the fundamental unit used in stratigraphic and structural interpretation. In reflection-based interpretation, it is the continuity and amplitude characteristics of the reflections and not the values of the voxels that make them up that are important. Accordingly, there is a need for a method to combine the speed of a computerized cell-based connectivity approach with the more accurate depiction of the subsurface inherent in reflection-based interpretation. The present inventive method satisfies this need.

SUMMARY OF THE INVENTION

In one embodiment, the present invention is a method for seed detection of seismic objects in a 3-D seismic data volume, the 3-D seismic data volume comprising a plurality of vertical seismic data traces. The inventive method comprises the steps of (a) determining the value of a preselected seismic attribute at a plurality of data points along each seismic data trace; (b) selecting a first set of criteria for classifying each seismic data trace, based on the attribute values, into trace segments that are either acceptable or unacceptable for inclusion in a seismic object; (c) selecting a second set of criteria for allowing or preventing lateral propagation of a seismic object from one seismic data trace to an adjacent seismic data trace; (d) selecting an initial data point in the 3-D seismic data volume as a seed point and attempting to grow a seismic object around the seed point based on the first and second sets of criteria; (e) repeating step (d) for each other data point in the 3-D seismic data volume; and (f) outputting seismic objects that satisfy preselected criteria for minimum and maximum size. The preselected seismic attribute may be seismic amplitude, acoustic impedance, discontinuity, or any other attribute capable of being defined on a point-by-point basis.

In a second embodiment, the invention comprises a method for determining the size and shape of a specific seismic object in a 3-D seismic data volume, the 3-D seismic data volume comprising a plurality of vertical seismic data traces. In this embodiment, the method comprises the steps of: (a) determining the value of a preselected seismic attribute at a plurality of data points along each seismic data trace; (b) selecting a first set of criteria for classifying each seismic data trace, based on the attribute values, into trace segments that are either acceptable or unacceptable for inclusion in the seismic object; (c) selecting a second set of criteria for allowing or preventing lateral propagation of the seismic object from one seismic data trace to an adjacent seismic data trace; (d) selecting a seed point falling within the seismic object and growing the seismic object around the seed point based on the first and second sets of criteria; and (e) outputting the size and shape of the seismic object. As with the first embodiment, the preselected seismic attribute may be seismic amplitude, acoustic impedance, discontinuity, or any other attribute capable of being defined on a point-by-point basis.

The first set of criteria may include threshold criteria for the value of the preselected seismic attribute and trace segment length requirements. Lateral propagation of the seismic object from one seismic data trace to an adjacent seismic data trace preferably is permitted only at peaks or troughs of acceptable data trace segments, and the second set of criteria preferably includes maximum vertical offset between corresponding acceptable peaks or troughs on adjacent seismic data traces. Further, the seismic object preferably should be prevented from including more than one discrete segment from any one seismic data trace so that no part of the seismic object may overlie another part.

DETAILED DESCRIPTION

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

The present inventive method is applied to a 3-D seismic data volume for a selected seismic attribute. For example, the attribute could be acoustic impedance, and the impedance values might be obtained by inverting seismic data. Alternatively, the data volume might be values of the seismic amplitudes themselves, and the terms "seismic attribute" or "attribute" as used herein will be understood to be broad enough to encompass this. However, the selected attribute may be discontinuity (trace-to-trace correlation) or any other attribute besides amplitude or impedance that can be defined on a point-by-point or cell-by-cell basis.

Figure 1A:
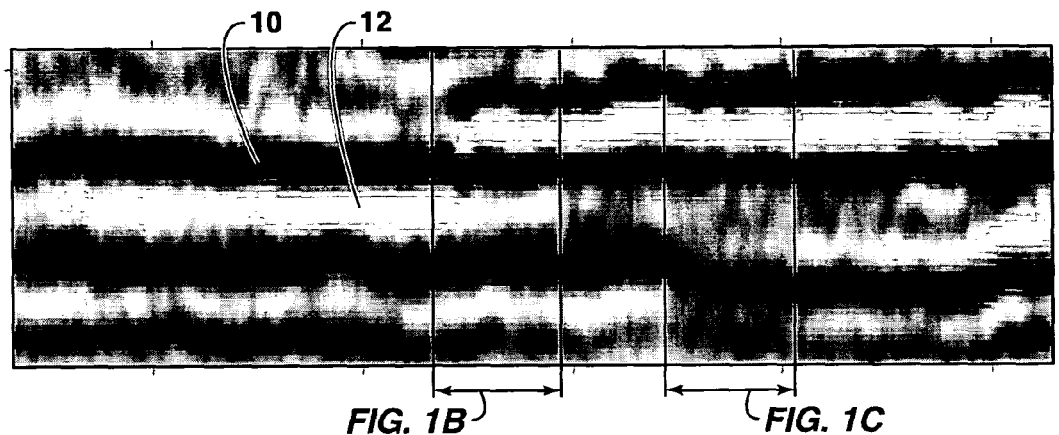
FIG. 1A is a variable intensity amplitude, vertical cross section extracted from a 3-D seismic data volume.
Figure 1B:
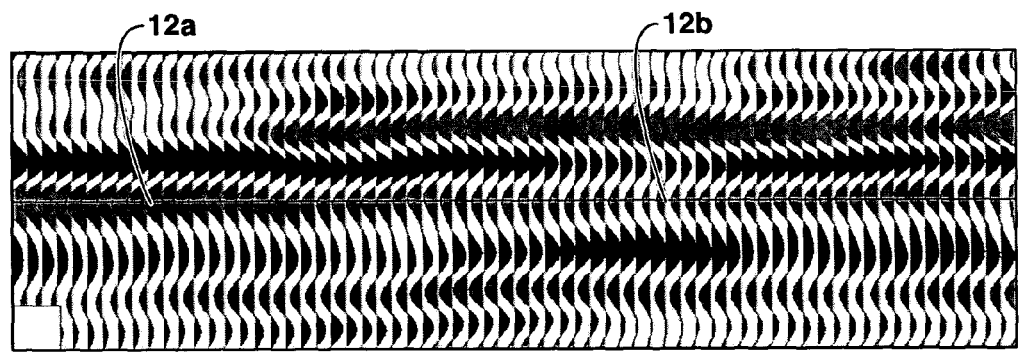
FIGS. 1B and 1C are expanded horizontal scale seismic wiggle trace displays of selected sub-areas of FIG. 1A.
Figure 1C:
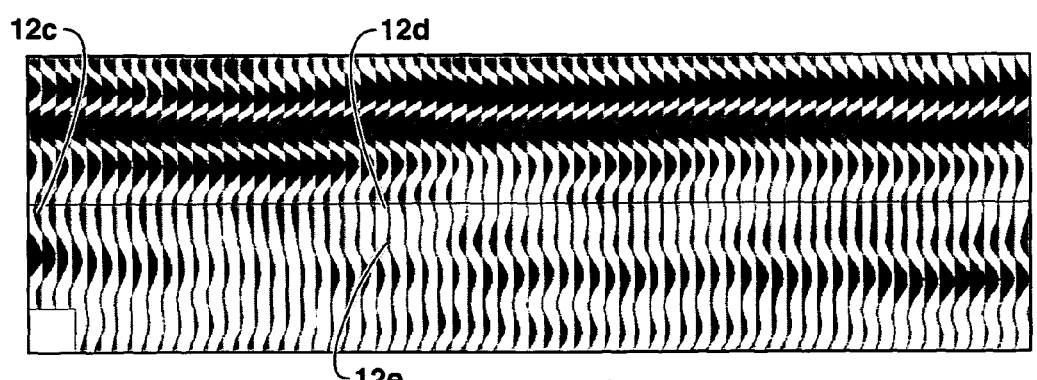

FIGS. 1A, 1B, and 1C present two versions of seismic displays from a single cross section extracted from a 3-D seismic data volume. The variable intensity amplitude display in FIG. 1A gives a gray shade value to each voxel ranging from positive maxima (peaks) shown in black, e.g., peak 10, to minima (troughs) shown in white, e.g., trough 12. FIGS. 1B and 1C show selected sub-areas of FIG. 1A in wiggle trace displays in which each seismic trace is represented by a continuous spline curve. The two display styles illustrate the differences in the models of the subsurface used by conventional seed detection and that of the present invention. Purely cell-based seed detection algorithms treat the subsurface much like the pixilated display of FIG. 1A in which the fundamental units are voxels (3-D pixels with x,y,z coordinates and an attribute value). In such algorithms it is only the connectivity of the voxels that matters.

Using gray shades or, more typically, color displays on a workstation, the human eye readily discerns that the voxel attributes are not randomly distributed, but organized into discrete layers representing changes in subsurface acoustic properties. However, cell-based seed detection algorithms do not recognize this structure. Each cell is considered separately and connectivity analysis is a simple matter of checking the attribute values of immediately adjoining voxels to see if they fall within the user-defined thresholds. The wiggle trace displays seen in FIGS. 1B and 1C emphasize the attributes and geometries of reflections rather than voxels. Such features has lateral change in attribute value (e.g., the amplitude change between points 12a and 12b in FIG. 1B) and cycle splitting where one reflection splits into two (e.g., the cycle split between point 12c, and points 12d and 12e in FIG. 1C) can be seen in either display, but the wiggle trace display makes them more visible. The present inventive method blends the voxel-based and reflection-based approaches to achieve rapid seed detection that is stratigraphically consistent (i.e., that honors stratigraphic layering).

Figure 2A:
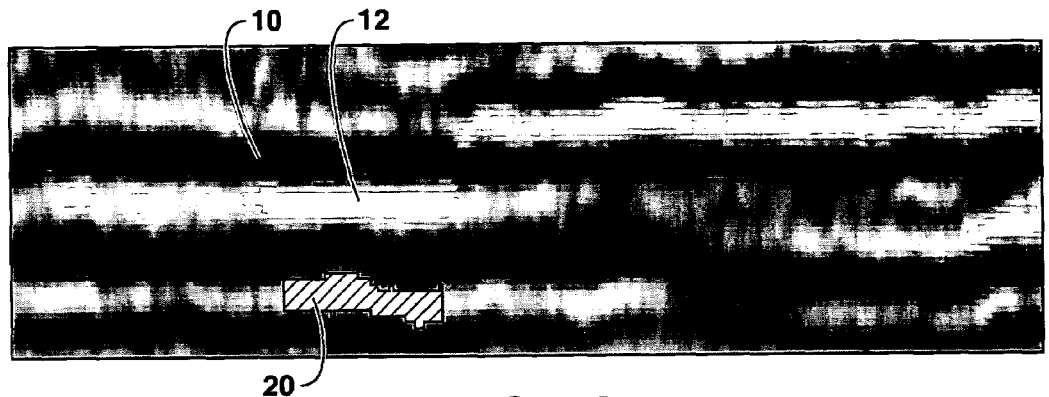
FIG. 2A is the variable intensity amplitude cross section of FIG. 1A showing the position of a geobody identified by both conventional seed picking and by the present invention.
Figure 2B:
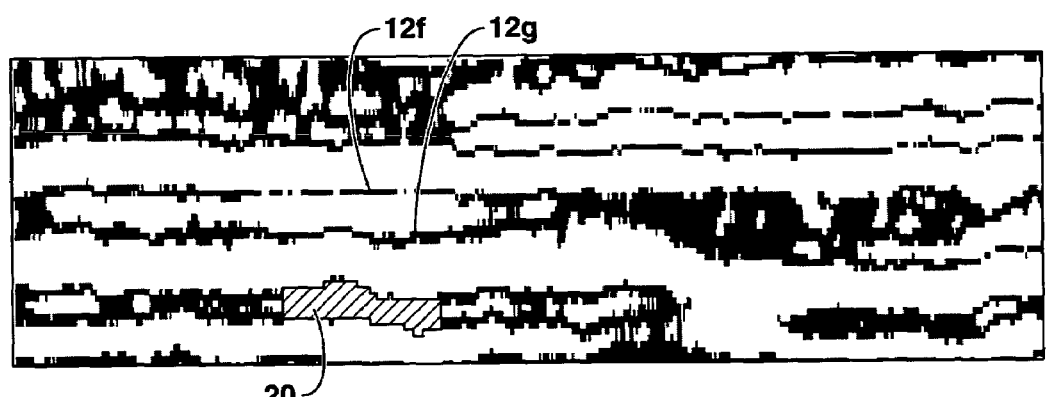
FIGS. 2B and 2C illustrate, respectively, the results obtained from conventional seed detection and from stratigraphic seed detection according to the present invention of a 3-D seismic data volume.
Figure 2C:
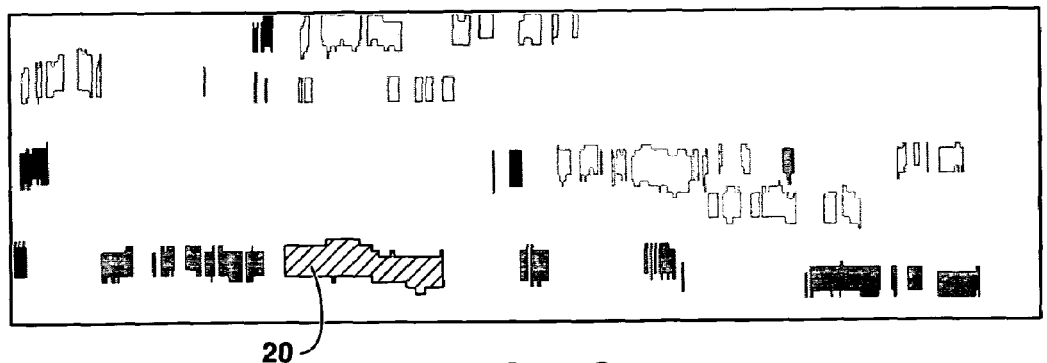

FIGS. 2A, 2B, and 2C illustrate the differences between conventional seed detection and the present method when applied to the same 3-D seismic data volume. The amplitude cross section shown in FIG. 1A is repeated in FIG. 2A with a small polygon 20 marking the position of a geobody that was detected by the conventional method as a part of a much larger body (FIG. 2B) and as a distinct body by the present method (FIG. 2C). The same amplitude thresholds were used for both runs. Thresholds were selected to capture voxels with moderately negative values.

Conventional seed detection picked a single large body containing over 8 million voxels after starting from a single seed point. FIG. 2B shows a cross section of the 3-D seismic data volume showing picked voxels in black. Although FIG. 2B appears to show more than one large body, in the actual 3-D seismic data volume all of the 8 million voxels were connected. Compare this result to the cross section generated by the present invention shown in FIG. 2C. Using the present method and selecting for troughs, the run resulted in 96 bodies being selected containing a total of approximately 800,000 voxels.

The single, large body picked by conventional seed detection (FIG. 2B) resulted in part from the "bleeding" of the region-growing algorithm along the top and bottom edges of high amplitude trough reflections. For example, in FIG. 2B, the black voxels labeled 12f and 12g represent the top and bottom edges, respectively, of trough 12 of FIG. 2A. These edge voxels are not significant measures of subsurface geology. They merely represent the transitions between significant events (peaks and troughs). Nevertheless, because their amplitudes fall into the specified attribute range, conventional seed detection picked these voxels. The present method (FIG. 2C) has "stratigraphic awareness," in that it grows regions of connected voxels within discrete layers (reflections in this case). The method is able to pick numerous separate bodies because it is a bulk method that accepts any viable seed point in the data volume as a starting point for region growing. Only those regions that grow beyond minimum body size are eventually accepted, however.

Note the body cross section 20 in FIG. 2C is also present in FIG. 2B where it represents one small part of the large body. The differences between the two methods are not as great when thresholds are set to accept only extreme values of attributes (positive or negative), but when it comes to picking bodies with moderate or low amplitudes, the "edge bleeding" problem of conventional seed detection renders it virtually useless.

Figure 3A:
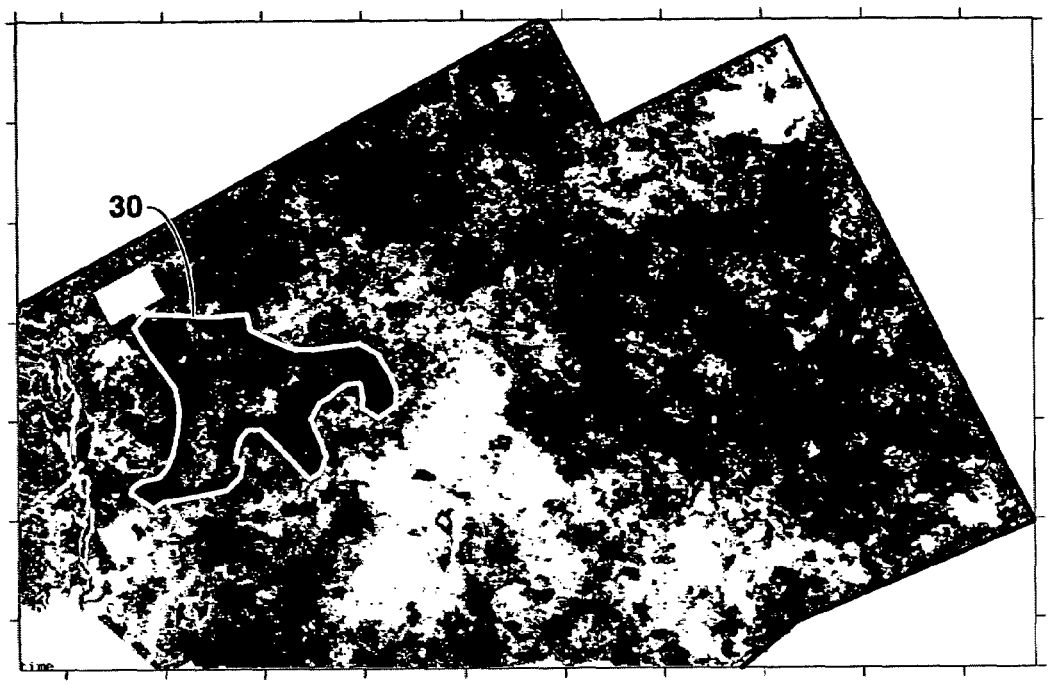
FIGS. 3A and 3B are map projections of thin slabs of 3D seismic data, each five voxels thick, comparing the region picked by conventional seed picking (FIG. 3A) and by stratigraphic seed picking according to the present invention (FIG. 3B) from a 3-D seismic data volume.
Figure 3B:
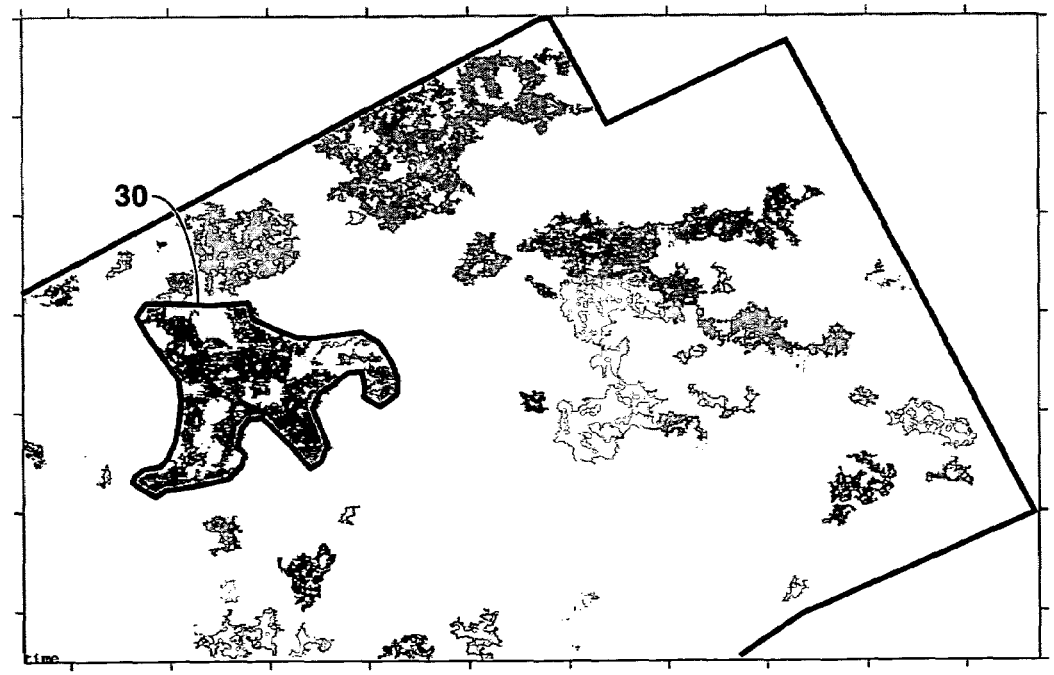

FIGS. 3A and 3B complete the comparison of conventional seed detection and seed detection according to the present invention by showing two map view 3-D slices, each 5 voxels thick. Note the pervasive, amorphous character of the black selected region in FIG. 3A (conventional seed detection) as compared to the discrete bodies (gray shades) picked by stratigraphic seed detection according to the present invention in FIG. 3B. The body 30 picked by the present inventive method (see FIG. 3B) is also present in FIG. 3A, but is very difficult to identify due to the surrounding black voxels.

Seed detection within a stratigraphic context requires that the detection algorithm take into account the organization of seismic data into reflections (or layering in other types of attributes). FIGS. 4 through 7 and 11 through 13 illustrate possible techniques used by the present inventive method to perform stratigraphic seed detection. For illustrative purposes, FIGS. 4 through 7 and 11 through 13 are configured to show seed detection for troughs (negative amplitudes). However, the present invention may easily be configured to detect peaks (positive amplitudes) and the detection of both troughs and peaks is within the scope of the invention.

Figure 4:
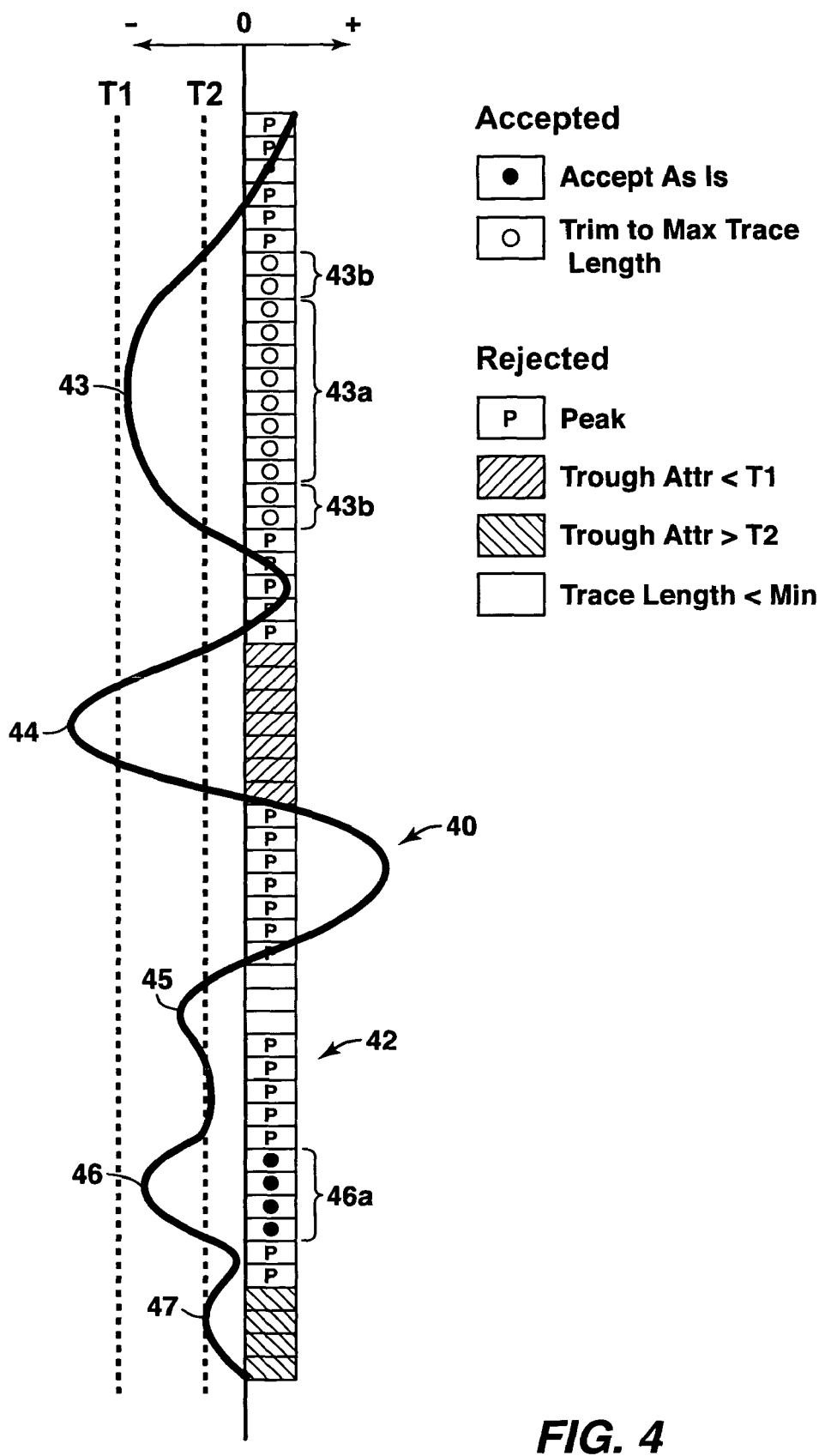
FIG. 4 illustrates the classification of a seismic wiggle trace into acceptable and unacceptable segments based on the logic used in the present invention.

FIG. 4 illustrates the classification of a seismic wiggle trace 40 into acceptable and unacceptable segments based on the logic used in the present invention. Also shown in FIG. 4 is a stack of voxels 42 representing the attribute values of the wiggle trace at the corresponding discrete sample points. Each voxel is marked as accepted or rejected, as follows. Troughs with minima greater than threshold T1 and less than threshold T2 are the targeted events. In addition to the attribute threshold criteria, preferably there are trace segment length requirements. From top to bottom there are five troughs 43 through 47 shown in FIG. 4. The first trough 43 is accepted, but the number of constituent voxels exceeds the user set limit and the segment is trimmed to the limit symmetrically about the minimum. In other words, voxels 43a are accepted, while voxels 43b are trimmed. The second trough 44 is rejected because its minimum exceeds the T1 cut off. Trough 45 is rejected as it does not meet the trace length minimum. Trough 46 is accepted without alteration. Finally, trough 47 is rejected as its minimum point is greater than T2. Thus, application of the logic used in the present invention to trace 40 results in acceptance of the four voxels labeled 46a and the eight voxels labeled 43a, and rejection of all other voxels.

Figure 5:
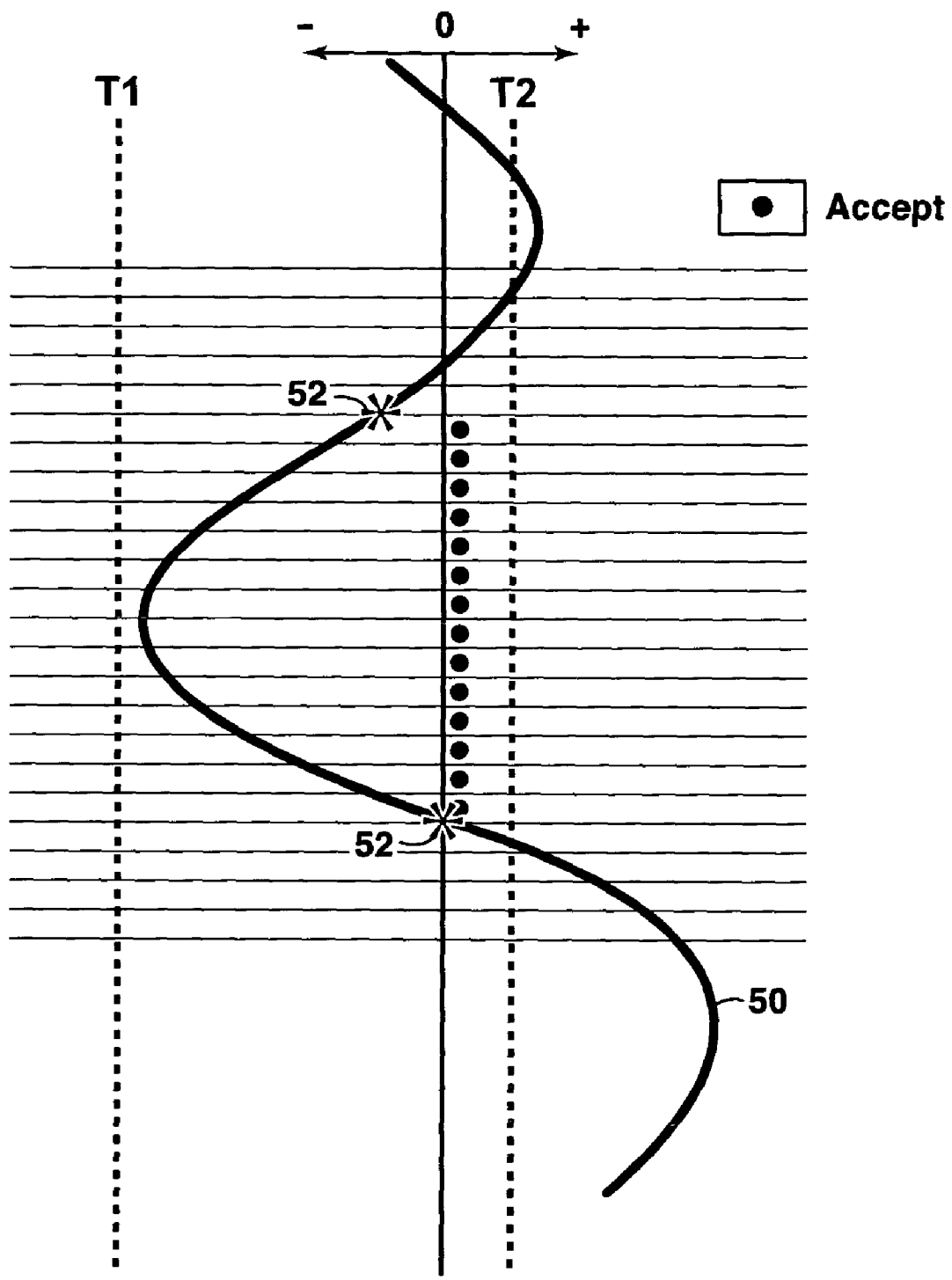
FIG. 5 illustrates the use of inflection points to break a seismic wiggle trace into peaks and troughs.

The attribute thresholds T1 and T2 can be set to any reasonable value as long as T1<T2. Placement of the thresholds is independent of the zero attribute line so that the user can target troughs made up of positive attributes or conversely, peaks that occur on the negative side of the zero line. Breaking the trace into peaks and troughs is accomplished by searching for inflection points where the change in vertical attribute gradient is zero and there is no change in the gradient's sign (the latter condition rules out local minima or maxima). FIG. 5 graphically depicts the use of inflection points to break a trace 50 into peaks and troughs. In this case the number of voxels accepted is determined by the position of the inflection points 52 which bound a seismic trough. In other cases the number of acceptable voxels may be determined by the maximum trace length condition or by the threshold T2 if either one is reached before the inflection point(s).

Figure 6:
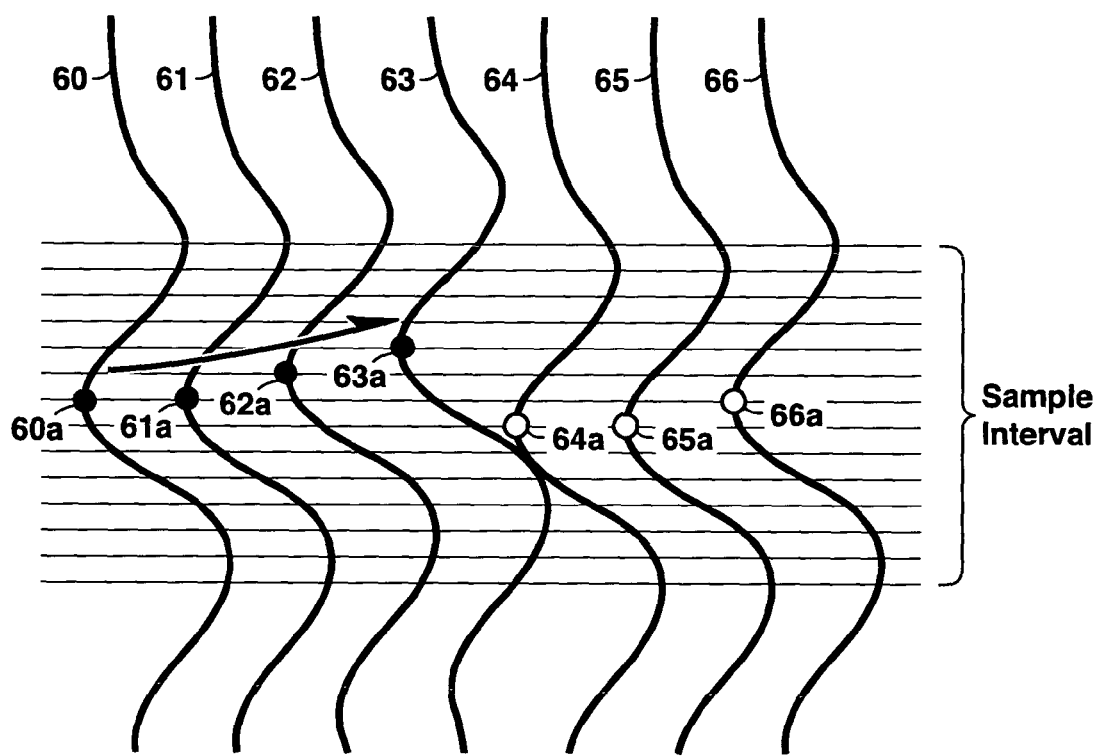
FIG. 6 illustrates lateral propagation of a geobody from one trace to an adjacent trace using the maximum allowable vertical offset criterion.

FIGS. 4 and 5 explain the criteria for acceptance or rejection of voxels in trace segments, but they do not cover the method for growing a body laterally from trace to trace. This trace to trace jumping or "bleeding" is the source of many problems for conventional seed detection as witnessed by the detection of the one large body in FIGS. 2B and 3A. The present invention takes advantage of constraints provided by the reflections (or local maxima or minima in data other than seismic amplitude) to prevent runaway bleeding of the seed detection. Lateral propagation of a body from one trace to an adjacent trace is only allowed at the peak or trough position. At the beginning of the run the user selects the maximum allowable vertical offset between adjacent peaks or troughs (hereinafter referred to as "Jump_Max"). In another embodiment the Jump_Max limit is spatially variable and derived from calculations of regional stratigraphic dip. FIG. 6 illustrates how the seismic object is allowed to grow laterally when the trough's vertical offset between traces is less than or equal the Jump_Max setting. Lateral body growth in a given direction terminates when the vertical offset between traces exceeds Jump_Max. FIG. 6 shows seven adjacent traces 60 through 66. Troughs 60a through 66a are marked. The maximum allowable vertical offset (Jump_Max) is set to one. Using this criterion, the seismic object is allowed to grow from trace 60 laterally to trace 63. The seismic object is not permitted to grow to trace 64 because the vertical offset between troughs 63a and 64a exceeds the maximum allowable vertical offset.

Figure 7A:
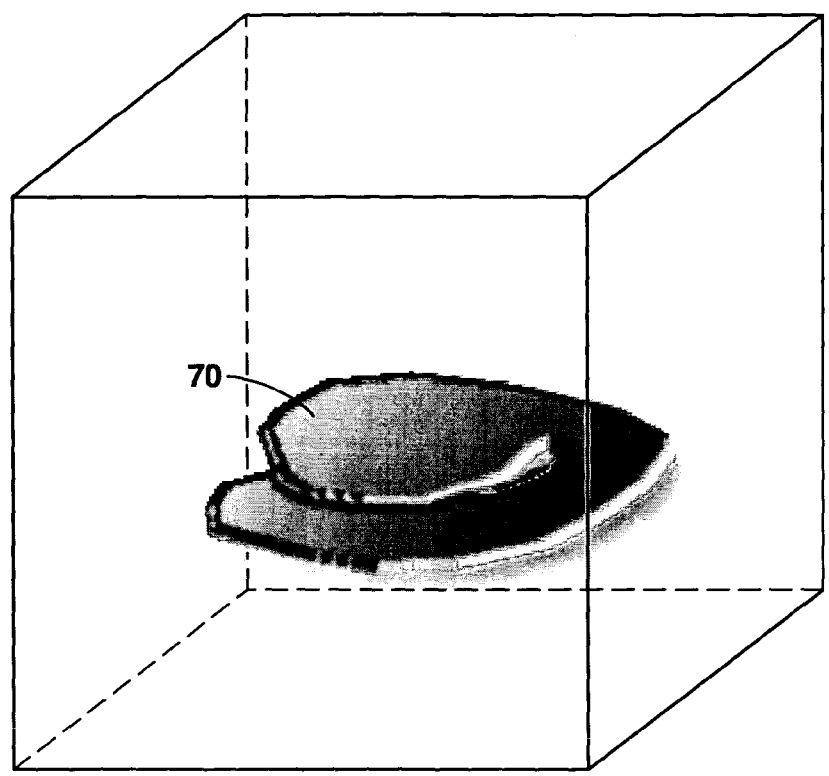
FIG. 7A illustrates a geologically unreasonable body, which can result from conventional seed picking where the body is allowed to overlie itself.
Figure 7B:
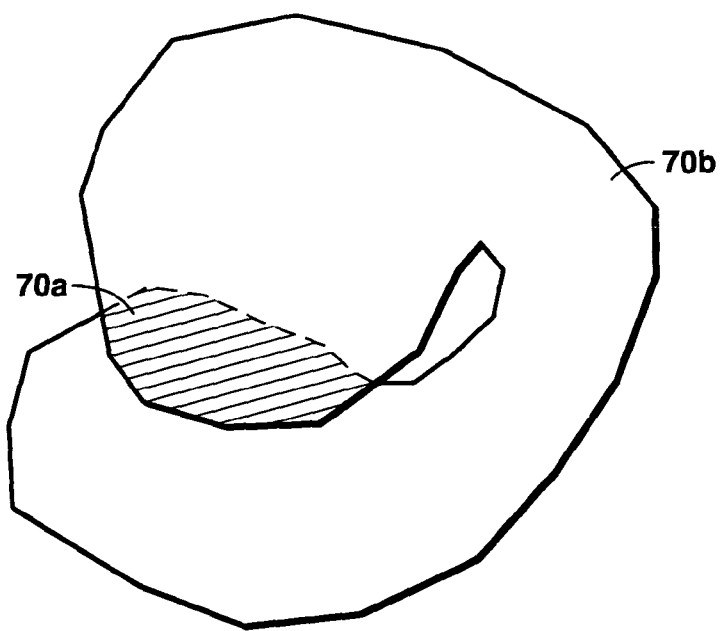
FIG. 7B illustrates two non-overlapping bodies, which result from use of the present method.

Minimization of body growth across stratigraphic and structural boundaries is a key benefit of the present invention. When seed detection algorithms allow unrestrained growth, geologically unreasonable bodies can result where a body overlies itself in a spiral pattern, as illustrated by body 70 in FIG. 7A. In addition to the limits on trace to trace lateral growth (Jump_Max) the present invention also limits vertical growth by use of an x-y map (FIG. 7B). Bodies are not permitted to overlie themselves (i.e., a single seismic object may not include more than one discrete segment of any single seismic data trace), and vertically overlapping areas (e.g., area 70a in FIG. 7B) are split into separate bodies (Area 70b in FIG. 7B is distinct from area 70a).

Figure 8:
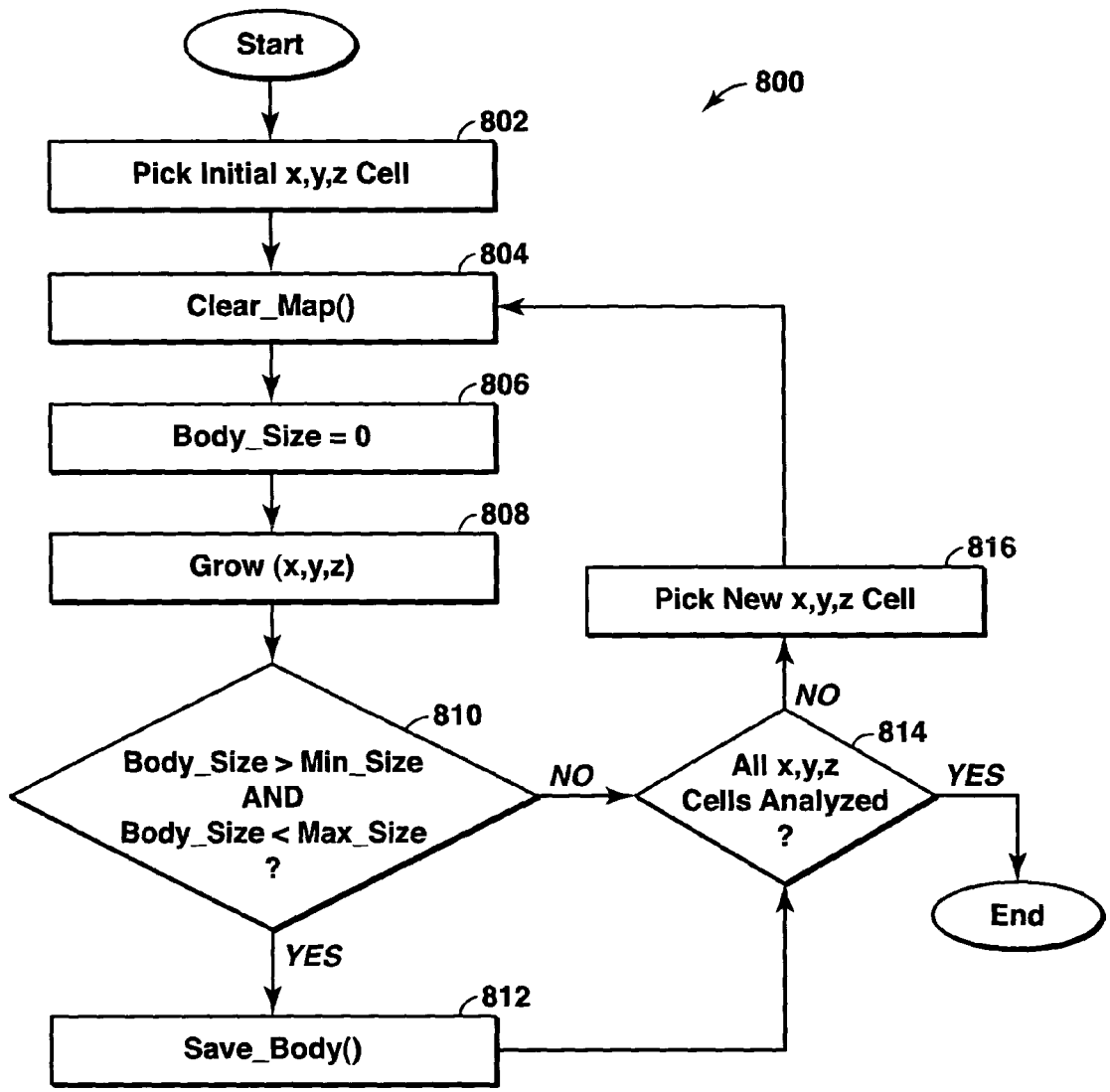
FIGS. 8 through 10 are flow charts showing the primary steps of the main loop and two primary subroutines of an exemplary computer program for practicing the present inventive method.
Figure 9:
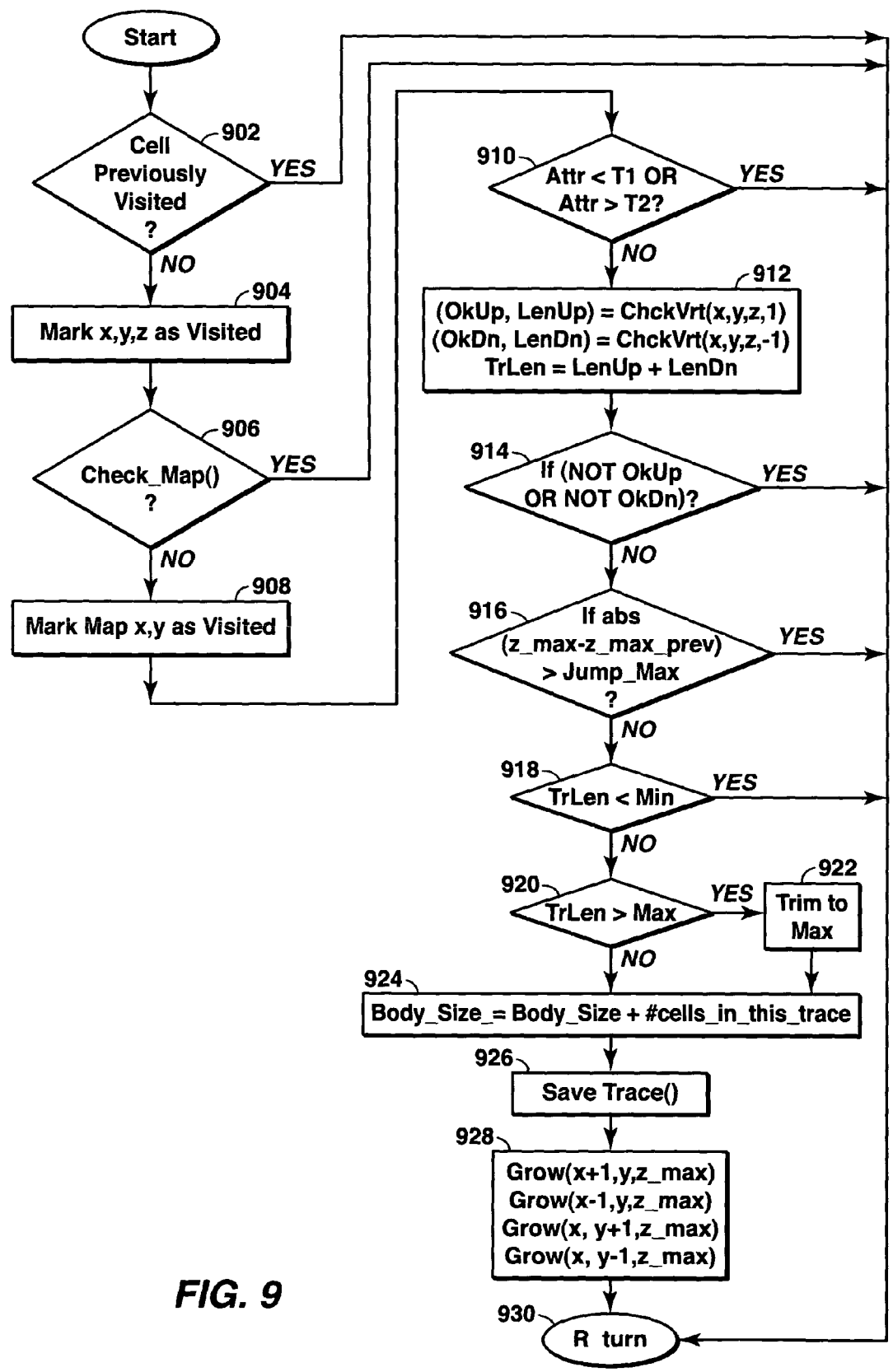
Figure 10:
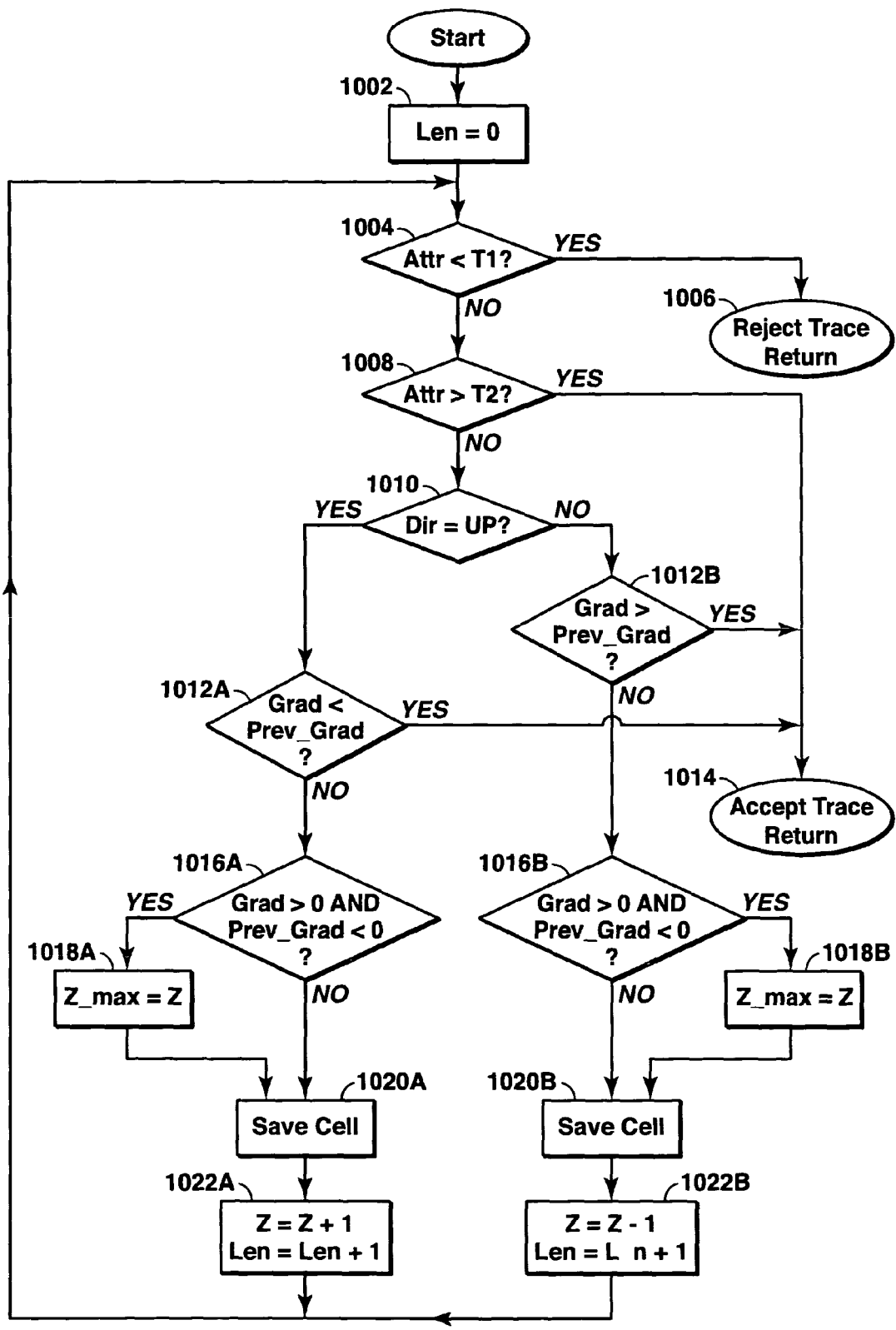

The present invention is capable of being applied manually. However, due to the large size of most 3-D seismic data volumes, the present inventive method preferably is practiced automatically using a suitably programmed digital computer. FIGS. 8 to 10 are flowcharts illustrating the primary steps of one computer program for practicing the present invention, and Tables 1 to 3 describe, respectively, the major functions, input controls, and variables used in the program. It will be understood that other computer programs for practicing the present invention could be developed by persons skilled in the art without departing from the true scope of the present invention. It will be understood that the specification of values for the input controls will depend such factors as frequency content of the data, the type of bodies expected or desired to extract, or other, and that iteration will be required by a person skilled in the art when analyzing a typical data set.

FIG. 8 shows the computer program's main loop 800. Since every cell in the seismic data volume is a potential seed point, the main loop preferably is applied to every (x,y,z) cell in the data volume. At step 802, an initial x,y,z cell is selected. Preferably, this initial cell is the 0,0,0 cell; however, any other cell in the data volume may be used as the starting point, if desired. At step 804, the x-y map for the seismic data volume is cleared. The map function is used to track the x-y position of each voxel analyzed and to ensure that no body overlies itself. At step 806, the body size is set to zero. The body size function is used to keep track of the size of growing bodies. At step 808, subroutine Grow (described in detail below in connection with FIG. 9) is called to attempt to grow a body from the selected x,y,z seed point. At step 810, the size (i.e., number of included voxels) of each body returned by Grow is checked. If the size of a body is greater than the user-defined minimum body size and less than the user-defined maximum body size, then the body is saved at step 812. If not, the body is discarded. The program then proceeds to step 814 which checks whether all x,y,z cells in the seismic data volume have been analyzed. If so, the program ends. If not, the program proceeds to step 816 where a new x,y,z cell is picked and steps 804 through 814 are repeated.

FIG. 9 illustrates the program execution flow for the subroutine Grow. This function takes an initial x,y,z point and attempts to grow a body in all directions. Multi-directional growing is accomplished by recursion. Recursion involves having the function repeatedly call itself until all avenues of expansion are blocked by the voxel acceptance criteria.

FIG. 9 illustrates the case where the user has selected troughs for detection. The user can also select positive events (peaks in amplitude data) for detection. Grow begins with step 902 where the subroutine checks if the cell has been previously visited. The program flow diverts back to the main loop (step 930) if the cell has already been checked. If it is a new cell, it is marked as visited in step 904 and the subroutine flow proceeds. At step 906 a map held in memory is checked to see if the x-y position has already been added to the body in an earlier pass through Grow. If the Check_Map step yields a positive answer then the cell is rejected (detected bodies are not permitted to overlie themselves). Otherwise the map is logged as visited in step 908 and flow continues to step 910 where the voxel is analyzed to see if its attribute value lies outside of the user specified thresholds.

Attribute values outside of the desired threshold cause the voxel to be rejected, whereas a valid value passes the voxel on to step 912 which calls another subroutine, ChckVrt (discussed below in connection with FIG. 10), to find the limits of the peak or trough in the specified trace. ChckVrt is actually called twice, once with a search direction value of −1 (search upward) and once with offset equal to +1 (search downward). If ChckVrt returns a valid trace, the flow continues to step 916 where the program checks the vertical change of the maximum (for peaks) or minimum (troughs) valued voxel from the previous trace. If the vertical offset is within the user specified allowable range (Jump_Max) Grow execution continues. Step 918 verifies that the trace has at least the minimum number of valid voxels for inclusion in the body. If the trace has a greater number of valid voxels than that specified by the user, the excess voxels are trimmed from the trace in step 922, which removes extra voxels symmetrically from the top and base of the trace. Preferably, in practice the user would set the maximum allowable trace length based on the wavelength of one-half cycle (peak or trough) of the input seismic survey. Step 924 adds the accepted voxels to the total of the growing body that is subsequently saved to a data structure in memory in step 926. Step 928 recursively calls subroutine Grow in an effort to expand the body in four directions within the plane containing the current voxel. Program flow returns to the main loop in step 930.

In step 912, Grow calls another function, ChckVrt (see FIG. 10), that analyzes the given trace segment vertically to search for inflection points and local minima and maxima. As illustrated in FIG. 10, ChckVrt is configured to detect troughs. Persons skilled in the art could easily modify this subroutine to detect peaks. In fact, the present inventive method can detect either peaks or trough- based on user input controls. ChckVrt determines the number of voxels in a given trace that will be assigned to the body. In FIG. 10, ChckVrt begins with step 1002 where the new trace's length value is initialized. Steps 1004 and 1008 verify that the voxel lies within the desired attribute range. If the voxel fails the minimum attribute test in step 1004 then the trace is rejected in step 1006 and program flow returns to subroutine Grow. If the voxel within the trace segment is greater than the minimum T2 threshold, the search stops and the voxels accepted up until that point are returned as valid (steps 1008 and 1014).

At step 1010 the program flow is directed down one of two paths depending on the search direction. The subsequent steps (1012A–1022A) are followed when the search direction is upward whereas steps (1012B–1022B) are used when searching downward. The search direction is specified by the parameter Dir on entry to the subroutine. The following description applies to the upward directed search, but it also applies to the downward path with the proviso that the inequality signs in 1012B and 1016B are reversed from 1012A and 1016A to account for the opposite search direction.

If the voxel attribute is in the specified attribute range, ChckVrt compares the vertical attribute gradient at the current position (current voxel's values minus previous voxel's value) to the gradient calculated in the previous pass through subroutine ChkVrt (step 1012A). If the current gradient is less than the previous gradient the subroutine has detected an inflection point (a transition from trough to peak in this case). Inflection point detection causes the subroutine to accept the trace and return to subroutine Grow in step 1014. If no inflection point is detected, then program flow continues to step 1016A where the voxel is checked to see if it is a local extreme (minimum for troughs or maximum for peaks). If the voxel is an extreme value within the trace segment the vertical position of the voxel is recorded in the Z_max variable (step 1018A). In step 1020A ChckVrt saves the voxel to the growing body and then moves to step 1022A to increment the vertical position of the counter before running through steps 1004–1022A again. ChckVrt execution is complete when the trace segment has been searched up and down and the limits of the event (inflection points of the peak or trough) have been found and/or one or more voxels have been rejected based on threshold constraints.

In an alternate embodiment, the present invention may be used to determine the size of the geobody surrounding a specified seed point. In this embodiment, the user selects a seed point of interest within a 3D cube. The Grow subroutine is then used to attempt to grow a geobody from the specified seed point based on specified stratigraphic criteria, as described above.

Figure 11A:
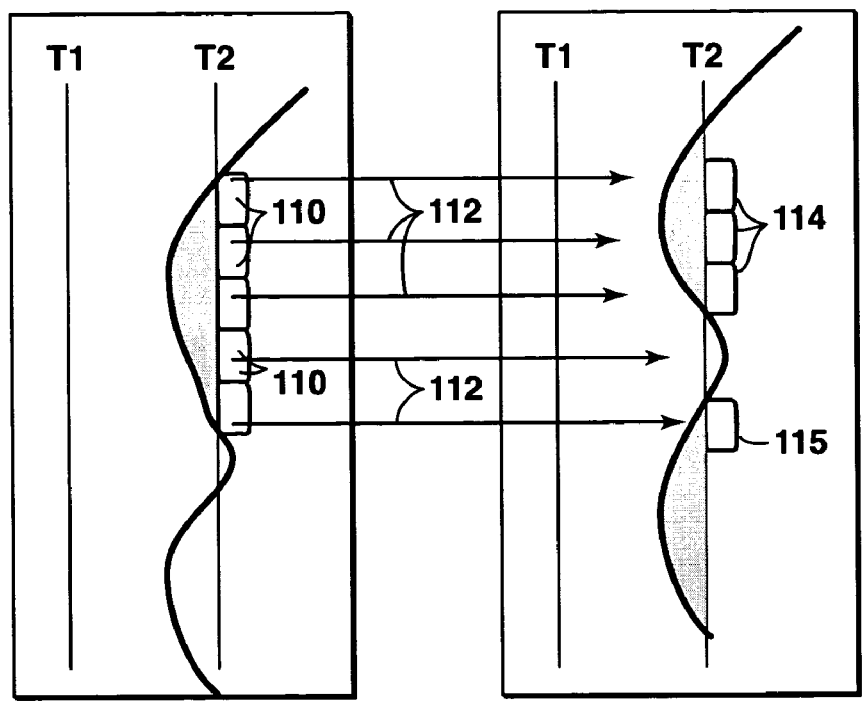
FIG. 11A illustrates lateral growth in conventional seed detection.
Figure 11B:
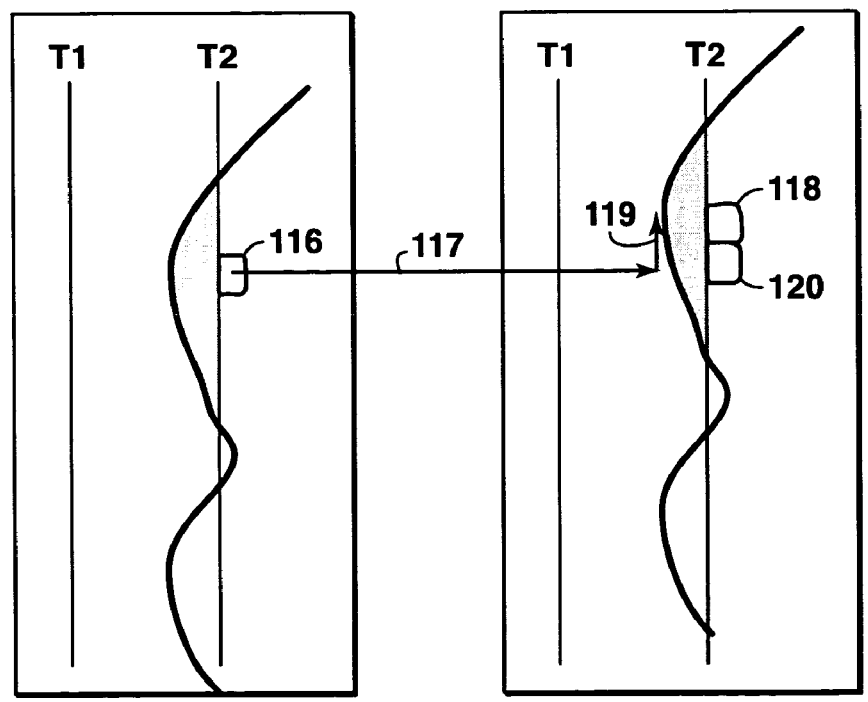
FIG. 11B illustrates lateral growth from stratigraphic seed detection according to the present invention.

The present invention includes three additional methods for controlling trace-to-trace (lateral) geobody growth. The first of these is illustrated in FIGS. 11A and B. As shown in FIG. 11A, in conventional seed detection, lateral growth (as shown by arrows 112) may take place from any previously selected set of voxels 110 to any laterally adjacent set of voxels 114 that meets the acceptance criteria. This approach may result in bifurcation of the geobody as voxels from more than one event are accepted (voxel 115 in FIG. 11A). In the present invention, as shown in FIG. 11B, lateral growth (as shown by arrow 117) only takes place from the local maximum or minimum valued voxel 116 to the next local maximum or minimum valued voxel 118. The use of this technique allows lateral growth to be controlled by checking the amount of vertical offset of the peak or trough event (see FIG. 6). In this example, the vertical offset from one minimum valued voxel to the next minimum valued equals one voxel (from voxel 120 to voxel 118 in FIG. 11B as shown by arrow 119).

Figure 12:
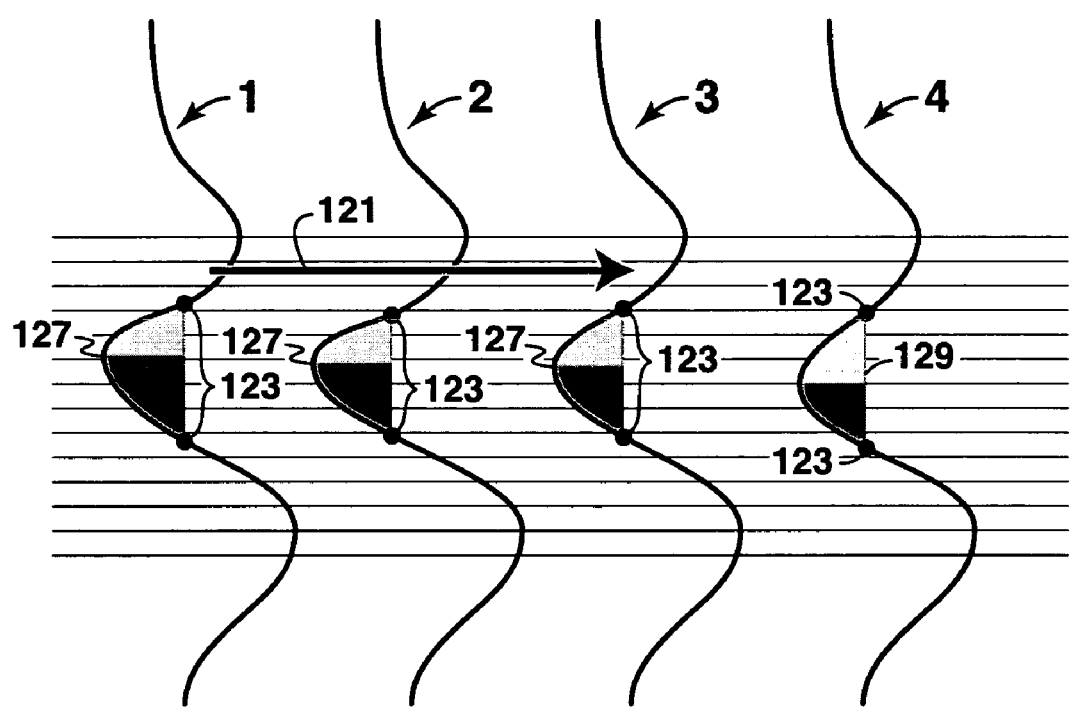
FIG. 12 illustrates lateral growth in seed detection where the local minimum occurs in the upper half of the top-weighted event.

As shown in FIG. 12, the second method to control geobody growth allows the user to target events in which the local minimum or maximum may not occur at the midway point in two way time (or depth) between inflection points 123. FIG. 12 presents a case where the user has targeted a "top weighted event" 127. A "top weighted event" occurs when the local minimum or maximum occurs in the upper half of an event bounded by two inflection points 123. The present invention allows lateral growth, (as shown by arrow 121) to occur as long as the user selected event asymmetry criteria are met. When the event does not meet these criteria, growth in that direction is terminated as shown in FIG. 12 when the wavelet becomes symmetrical at 129. For example, a user may select a top, symmetrical, or bottom weighted event that may be correlated to a subsurface parameter of interest (i.e. porosity).

The correlation of seismic reflection shape to a parameter of interest may be obtained from subsurface well control. Therefore, the symmetry of a seismic wavelet can be used as an indicator of the spatial distribution of a parameter of interest. A parameter of interest may include but is not limited to the net-to-gross reservoir, porosity, fluid type and saturation, lithology, facies, and pore pressure. If the shape of the wavelet is correlated to a parameter of interest, the user may estimate the spatial distribution of parameter of interest throughout a seismic survey by extrapolation of the correlated trace shape.

Figure 13A:
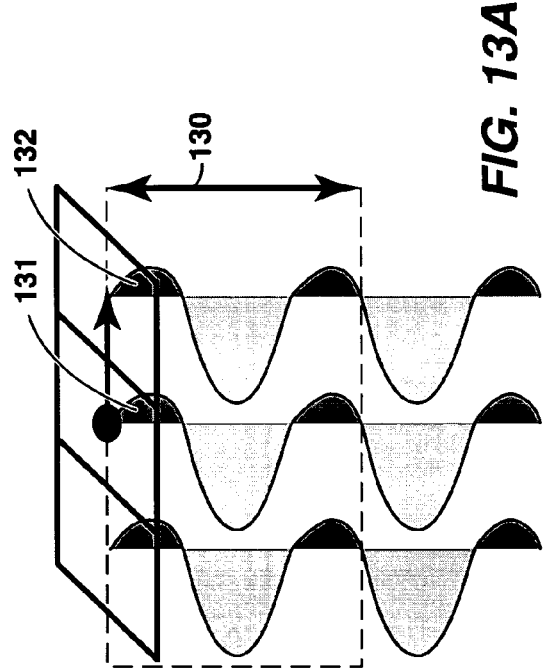
FIG. 13A illustrates a correlation window to control lateral body growth.
Figure 13B:
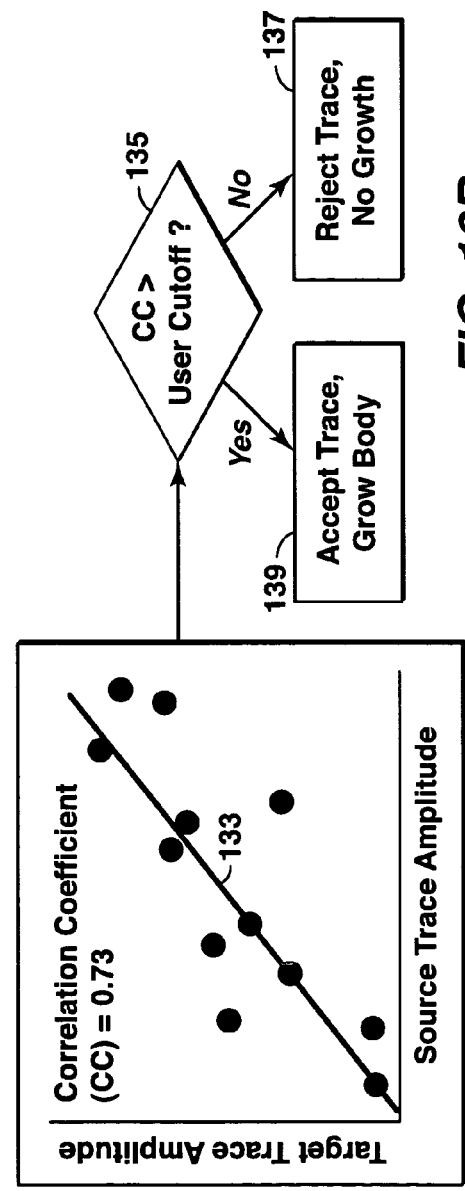
FIG. 13B illustrates application of a trace correlation coefficient cutoff value used to control lateral body growth.

The third technique employed by the present invention to control lateral body growth employs a trace-to-trace statistical correlation as an acceptance or rejection criteria. This technique is based on a previously patented method for imaging discontinuities in seismic data (U.S. Pat. No. 6,516,274). As shown in FIG. 13A, in this technique the user selects a correlation window (or time window) 130. The correlation window need not be in the same length as the thickness of the growing geobody.

Data from the correlation window is used to select adjacent sets of voxels for correlation as shown in FIG. 13A. The attribute values of the selected voxels from the source trace 131 and the target trace 132 are cross correlated and a correlation coefficient is calculated (133 in FIG. 13B). At step 135, the correlation value is statistically compares to the cutoff (selected by the user). At step 139, if the traces are deemed to be similar enough (meets the user cutoff) the body is allowed to grow to the next trace. Step 137 is reached if the traces are deemed not to be similar enough (correlation coefficient is less than the cutoff) and the body is not allowed to grow to the next trace.

The foregoing description is directed to particular embodiments of the present invention for the purpose of illustrating the invention. However, it should be understood that the invention is not to be unduly limited to the foregoing. Various modifications and alterations will be apparent to persons skilled in the art without departing from the true scope of the invention, as defined in the appended claims.

TABLE 1

MAJOR FUNCTIONS

| Program Component | Description | Called By | Abbreviation In Flow Charts |
|---|---|---|---|
| Main Loop | Cycles through seed points in a 3D seismic cube. Every cell from the volume is a potential seed point and it is checked. | | Main Loop |
| Clear X-Y Map | Clears the map that tracks the x-y position of each voxel analyzed. | Main Loop | Clear_Map( ) |
| Check X-Y Map | Checks the x-y map each time a new voxel is about to be added to a body to make sure that no body can vertically overlie itself. | Grow | Check_Map( ) |
| Grow Body | Primary region (body) growing routine | Main Loop | Grow(x, y, z) |
| Check Trace Vertically | Checks if the trace is acceptable when investigated starting at Z and going in the direction dir. | Grow | ChckVrt(Z, dir) |
| Save Trace | Stores a vertical stack of voxels within a trace in a growing body. These voxels are part of the current body and they will be saved to output in Save_Body( ) routine. | Grow | Save_Trace( ) |
| Save Body | Saves voxels, which belong to recently detected body. | Main Loop | Save_Body( ) |

TABLE 2

INPUT CONTROLS

| Input Control | Description | Relevant Functions | Abbreviation In Flow Charts |
|---|---|---|---|
| Peak or Trough | User specifies whether the detection is to be done in high values attribute zones (peaks) or in low valued zones (troughs). | All | |
| Minimum Attribute Threshold | Minimum attribute value which is necessary for a given voxel to be accepted into a body | Grow, ChckVrt | T1 |
| Maximum Attribute Threshold | Maximum attribute value which is necessary for a given voxel to be accepted into a body | Grow, ChckVrt | T2 |
| Minimum Allowable Trace Length | Minimum number of vertically stacked voxels necessary for their inclusion in a growing body | Grow | TrLen Min |
| Maximum Allowable Trace Length | Maximum number of vertically stacked voxels to be included in a growing body. Voxels in excess of this value are trimmed; the rest are accepted. | Grow | TrLen Max |

TABLE 2-continued

INPUT CONTROLS

| Input Control | Description | Relevant Functions | Abbreviation In Flow Charts |
|---|---|---|---|
| Jump | Maximum vertical offset between peaks or troughs of adjacent traces. If offset is greater than this value the body is not allowed to grow to the next trace. | Grow | JumpMax |
| Minimum Body Size | Minimum size in voxels of acceptable bodies. | Main Loop | Min_Size |
| Maximum Body Size | Maximum size in voxels of acceptable bodies. | Main Loop | Max_Size |

TABLE 3

VARIABLES

| Variable | Description | Relevant Functions | Abbreviation In Flow Charts |
|---|---|---|---|
| X, Y, Z | Positional variables which allow 3 dimension location of each voxel. Z is vertical dimension. | All | x, y, z |
| Body Size | Keeps track of the size in voxels of growing bodies | Main Loop | Body_Size |
| Attribute | The value of the given attribute (seismic amplitude, impedance, etc.) at a particular voxel. | Grow, ChckVrt | Attr |
| Trace Ok Upward | Boolean variable that is set to TRUE if a trace is acceptable when investigated upwards. | Grow, ChckVrt | OkUp |
| Trace Ok Downward | Boolean variable that is set to TRUE if a trace is acceptable when investigated downwards. | Grow, ChckVrt | OkDn |
| Trace Length Upward | Number of voxels from a peak or trough to an inflection point when a trace is investigated upward. | Grow, ChckVrt | LenUp |
| Trace Length Downward | Number of voxels from a peak or trough to an inflection point when a trace is investigated downward. | Grow, ChckVrt | LenDn |
| Trace Length | Trace length in voxels (sum of LenUp and LenDn) | Grow, ChckVrt | TrLen |
| Z Position of Maximum (Peak) or Minimum (Trough) | The vertical position (z) of the peak or trough in the trace being analyzed | Grow, ChckVrt | Z_max |
| Z Position of Maximum (Peak) or Minimum (Trough) of Previous Trace | The vertical position (z) of the peak or trough in the trace analyzed in the previous lateral growth step | Grow, ChckVrt | Z_max_prev |
| Vertical Attribute Gradient | The change from voxel to voxel measured vertically on a given trace. Used to search for inflection points in an attribute along a given trace. | ChckVrt | Grad |
| Previous Vertical Attribute Gradient | The change from voxel to voxel measured vertically in the trace analyzed in the previous vertical growth step. Used to search for inflection points in an attribute along a given trace. | ChckVrt | Grad_Prev |
| Trace Search Direction | Dir is set to 1 to check trace characteristics downward and −1 for checking upwards. | ChckVrt | Dir |

What is claimed is:

1. A method for seed detection of seismic objects in a 3-D seismic data volume, said 3-D seismic data volume comprising a plurality of vertical seismic data traces, said method comprising the steps of:
   (a) determining the value of a preselected seismic attribute at a plurality of data points along each seismic data trace;
   (b) selecting a first set of criteria for classifying each seismic data trace based on said attribute values into trace segments that are either acceptable or unacceptable for inclusion in a seismic object;
   (c) selecting a second set of criteria for allowing or preventing lateral propagation of a seismic object from one seismic data trace to an adjacent seismic data trace, wherein the second set of criteria comprises at least one of multi-voxel structure, trace shape, vertical offset, trace-to-trace statistical correlation, a constraint on self-overlapping object growth and any combination thereof;
   (d) selecting an initial data point in said 3-D seismic data volume as a seed point and attempting to grow a seismic object around said seed point based on said first and second sets of criteria;
   (e) repeating step (d) for each other data point in said 3-D seismic data volume; and
   (f) outputting seismic objects that satisfy pre-selected criteria for minimum and maximum size.

2. The method of claim 1, wherein said first set of criteria include threshold criteria for the value of said preselected seismic attribute and trace segment length requirements.

3. The method of claim 2, wherein said threshold criteria include minimum and maximum thresholds for the value of said preselected seismic attribute.

4. The method of claim 2, wherein said trace segment length requirements include minimum and maximum lengths for acceptable trace segments.

5. The method of claim 4, wherein trace segments exceeding the maximum length requirement are trimmed symmetrically to the maximum length and then accepted.

6. The method of claim 1, wherein lateral propagation of the seismic object from the one seismic data trace to the adjacent seismic data trace is allowed only at peaks (local maxima) or troughs (local minima) of acceptable data trace segments, and wherein said second set of criteria includes maximum vertical offset between corresponding acceptable peaks or troughs on adjacent seismic data traces.

7. The method of claim 6, wherein said maximum vertical offset is spatially variable and is derived from calculation of regional stratigraphic dip.

8. The method of claim 1, wherein said preselected seismic attribute is seismic amplitude.

9. The method of claim 1, wherein said preselected seismic attribute is acoustic impedance.

10. The method of claim 1, wherein said preselected seismic attribute is discontinuity.

11. The method of claim 1, said method further comprising the step of preventing any seismic object from including more than one discrete segment of any single seismic data trace.

12. The method of claim 1 wherein lateral propagation is controlled by checking the amount of vertical offset of the local minimum or maximum.

13. The method of claim 1 wherein lateral growth is controlled by shape of a wavelet.

14. The method of claim 13 further comprising correlating the shape of the wavelet to a parameter of interest and using the correlation of the shape of the parameter of interest to estimate the parameter of interest throughout a seismic survey.

15. The method of claim 14 where in the parameter of interest is chosen from the group comprising net to gross, porosity, fluid type, saturation, lithology and facies and any combination thereof.

16. The method of claim 1 wherein the lateral growth is controlled by a trace-to-trace statistical correlation.

17. A method for determining the size and shape of a seismic object in a 3-D seismic data volume, said 3-D seismic data volume comprising a plurality of vertical seismic data traces, said method comprising the steps of:
   (a) determining the value of a preselected seismic attribute at a plurality of data points along each seismic data trace;
   (b) selecting a first set of criteria for classifying each seismic data trace based on said attribute values into trace segments that are either acceptable or unacceptable for inclusion in said seismic object;
   (c) selecting a second set of criteria for allowing or preventing lateral propagation of said seismic object from one seismic data trace to an adjacent seismic data trace, wherein the second set of criteria comprises at least one of multi-voxel structure, trace shape, vertical offset, a constraint on self-overlapping object growth and any combination thereof;
   (d) selecting a seed point falling within said seismic object and growing said seismic object around said seed point based on said first and second sets of criteria; and
   (e) outputting the size and shape of said seismic object.

18. The method of claim 17, wherein said first set of criteria include threshold criteria for the value of said preselected seismic attribute and trace segment length requirements.

19. The method of claim 18, wherein said threshold criteria include minimum and maximum thresholds for the value of said preselected seismic attribute.

20. The method of claim 18, wherein said trace segment length requirements include minimum and maximum lengths for acceptable trace segments.

21. The method of claim 20, wherein trace segments exceeding the maximum length requirement are trimmed symmetrically to the maximum length and then accepted.

22. The method of claim 17, wherein lateral propagation of said seismic object from one seismic data trace to an adjacent seismic data trace is allowed only at peaks (local maxima) or troughs (local minima) of acceptable data trace segments, and wherein said second set of criteria includes maximum vertical offset between corresponding acceptable peaks or troughs on adjacent seismic data traces.

23. The method of claim 22, wherein said maximum vertical offset is spatially variable and is derived from calculation of regional stratigraphic dip.

24. The method of claim 17, wherein said preselected seismic attribute is seismic amplitude.

25. The method of claim 17, wherein said preselected seismic attribute is acoustic impedance.

26. The method of claim 17, wherein said preselected seismic attribute is discontinuity.

27. The method of claim 17, said method further comprising the step of preventing said seismic object from including more than one discrete segment of any single seismic data trace.

28. The method of claim 17 where in lateral propagation is controlled by checking the amount of vertical offset of a local maximum or minimum.

29. The method of claim 17 wherein lateral growth is controlled by shape of a wavelet.

30. The method of claim 29 further comprising correlating the shape of the wavelet to a parameter of interest and using the correlation of the shape to the parameter of interest to estimate the parameter of interest throughout a seismic survey.

31. The method of claim 30 wherein the parameter of interest is chosen from the group comprising net to gross, porosity, fluid type, saturation, lithology and facies and any combination thereof.

32. The method of claim 17 wherein the lateral growth is controlled by a trace-to-trace statistical correlation.

* * * * *